(12) United States Patent
Lalanne et al.

(10) Patent No.: US 11,089,252 B2
(45) Date of Patent: Aug. 10, 2021

(54) PIXEL WITH GLOBAL SHUTTER

(71) Applicant: STMicroelectronics (Crolles 2) SAS, Crolles (FR)

(72) Inventors: Frederic Lalanne, Bernin (FR); Pierre Malinge, Bernin (FR)

(73) Assignee: STMicroelectronics (Grolles 2) SAS, Crolles (FR)

(*) Notice: Subject to any disclaimer, the term of this patent is extended or adjusted under 35 U.S.C. 154(b) by 198 days.

(21) Appl. No.: 16/254,821

(22) Filed: Jan. 23, 2019

(65) Prior Publication Data

US 2020/0236320 A1    Jul. 23, 2020

(51) Int. Cl.
*H04N 5/3745*  (2011.01)
*H04N 5/353*   (2011.01)
*H04N 5/378*   (2011.01)

(52) U.S. Cl.
CPC ......... *H04N 5/37452* (2013.01); *H04N 5/353* (2013.01); *H04N 5/378* (2013.01)

(58) Field of Classification Search
CPC .... H04N 5/37452; H04N 5/353; H04N 5/378; H04N 5/3575; H04N 5/335; H04N 5/369
See application file for complete search history.

(56) References Cited

U.S. PATENT DOCUMENTS

2009/0046187 A1* 2/2009 Ooshima ............ H04N 5/3575
                                                  348/302
2019/0020837 A1* 1/2019 Lo ................... H04N 5/36965

* cited by examiner

*Primary Examiner* — Mekonnen D Dagnew
(74) *Attorney, Agent, or Firm* — Crowe & Dunlevy

(57) ABSTRACT

A pixel includes a photosensitive circuit, a sense node, a first transistor and a first capacitor. A first electrode of the first capacitor is connected to a control terminal of the first transistor. A second electrode of the first capacitor is to a node of application of a first control signal.

25 Claims, 13 Drawing Sheets

PIXEL WITH GLOBAL SHUTTER

TECHNICAL FIELD

The present disclosure generally concerns image sensors, and more particularly the pixels of such image sensors.

BACKGROUND

Image sensors are known in the art which are global shutter sensors global shutter pixels. These pixels typically include a large number of transistors. There is a need in the art to provide a pixel supporting a global shutter operation which comprises a decreased number of transistors as compared with known pixels, particularly as compared with global shutter pixels.

SUMMARY

In an embodiment, a pixel comprises: a photosensitive area; a sense node; a first transistor; and a first capacitor having a first electrode connected to a control terminal of the first transistor and having a second electrode connected to a node of application of a first control signal.

The first transistor is connected between a node of application of a power supply potential and an output node of the pixel, the control terminal of the first transistor being coupled to an inner node of the pixel.

The pixel further comprises a second transistor having a control terminal connected to the sense node, having a first conduction terminal connected to the inner node, and having a second conduction terminal connected to a first node of application of the power supply potential or of a second control signal.

The first node is a node of application of the second control signal and no transistor configured to deliver a bias current to the second transistor is connected to the inner node.

The pixel further comprises a third transistor having a first conduction terminal connected to the sense node and having a control terminal connected to a node of application of a third control signal. A second conduction terminal of the third transistor is connected to a node of application of the power supply potential. Alternatively, a second conduction terminal of the third transistor is connected to a node of application of a fourth control signal.

The first transistor is an output transistor, while the second transistor is a readout transistor and the third transistor is a reset transistor. So, the first control signal is an output control signal, while the second control signal is a signal for controlling the second transistor, the third control signal is a reset control signal and the fourth control signal is a second reset control signal.

The pixel further comprises: a storage selection transistor connected between the first electrode of the first capacitor and the inner node; a second output transistor having a first conduction terminal connected to a node of application of the power supply potential, having a second conduction terminal connected to a second output node and having a control terminal coupled to the inner node; and a second capacitor having a first electrode connected to the control terminal of the second output transistor and having a second electrode connected to a node of application of a second output control signal.

The pixel further comprises: a second capacitor having a first electrode coupled to the inner node and having a second electrode connected to a node of application of a second output control signal; and a storage selection transistor connected between the first electrode of the first capacitor and a first electrode of the second capacitor.

The first electrode of the second capacitor is connected to the inner node, or the pixel comprises a second storage selection transistor connected between the first electrode of the second capacitor and the inner node.

The pixel further comprises a transfer transistor connected between the photosensitive area and the sense node.

In an embodiment, an image sensor comprises an array of pixels such as defined hereabove.

In an embodiment, a method for controlling a pixel such as defined hereabove comprises: turning off the first transistor by setting the first control signal to a first potential and, to read out an output signal of the pixel, turning on the first transistor by setting the first control signal to a second potential.

In an embodiment, a pixel comprises: a photosensitive area; a sense node; a first transistor having a control terminal connected to the sense node and having a first conduction terminal connected to a node of application of a first control signal.

A second conduction terminal of the first transistor is connected to an inner node, with no transistor configured to deliver a bias current to the first transistor being connected to the inner node.

The pixel further comprises a second transistor having a control terminal coupled to the inner node, having a first conduction terminal connected to a node of application of a power supply potential, and having a second conduction terminal coupled to an output node.

The pixel comprises a first capacitor having a first electrode connected to the control terminal of the second transistor.

The first transistor is a readout transistor and the second transistor is an output transistor. The first control signal is a signal for controlling the first transistor.

The pixel further comprises a reset transistor having a first conduction terminal connected to the sense node, having a control terminal connected to a node of application of a reset control signal, and having a second conduction terminal connected to a first node of application of the power supply potential or of a second reset control signal.

The pixel further comprises a second capacitor and a storage selection transistor connected between the first electrode of the first capacitor and a first electrode of the second capacitor, the first electrode of the second capacitor being coupled to the inner node, or the pixel comprises: a storage selection transistor connected between the first electrode of the first capacitor and the inner node; a second output transistor having a first conduction terminal connected to a node of application of the power supply potential, having a second conduction terminal coupled to a second output node of the pixel, and having a control terminal coupled to the inner node; and a second capacitor having a first electrode connected to the control terminal of the second output transistor.

A second electrode of each capacitor is connected to a node of application of a reference potential, with the pixel further comprising a row selection transistor connected between the second conduction terminal of the output transistor and the output node.

Alternatively, a second electrode of each capacitor is connected to a node of application of a readout control signal, with the second conduction terminal of the output transistor being connected to the output node.

The second conduction terminal of the second output transistor is connected to the second output node, or the pixel comprises a second row selection transistor connected between the second conduction terminal of the second output transistor and the second additional output node.

The first node is a node of application of the power supply potential and the pixel further comprises a second row selection transistor connecting the first electrode of the second capacitor to the inner node, or the first node is a node of application of the second reset control signal and the first electrode of the second capacitor is connected to the inner node.

The pixel further comprises a transfer transistor connected between the photosensitive area and the sense node.

Another embodiment provides an image sensor comprising an array of pixels such as defined hereabove.

In another embodiment, a method of controlling a pixel such as defined hereabove, comprises, for each storage representative of a potential level of the sense node, the first control signal applied to the node having the conduction terminal of the first transistor connected thereto is a potential ramp.

In another embodiment, a pixel comprises: a photosensitive area; a sense node; a first transistor having a control terminal connected to the sense node; and a second transistor having a conduction terminal connected to the sense node, having a control terminal connected to a node of application of a first control signal, and having its other conduction terminal connected to a node of application of a second control signal.

The first conduction terminal of the first transistor is connected to an inner node and a second conduction terminal of the first transistor is connected to a node of application of a power supply potential or to a node of application of a third control signal.

The second terminal of the readout transistor is connected to the node of application of the third control signal and no transistor configured to deliver a bias current to the first transistor is connected to the inner node.

The pixel further comprises a third transistor having a first conduction terminal connected to a node of application of the power supply potential, having a second conduction terminal coupled to an output node, and having a control terminal coupled to the inner node. The pixel further comprises a first capacitor having a first electrode connected to the control terminal of the third output transistor; and a fourth transistor connected between the first electrode of the capacitor and the inner node.

The pixel further comprises a second capacitor having a first electrode connected to the inner node.

The first transistor is a readout transistor, the second transistor is a reset transistor, the third transistor is an output transistor and the fourth transistor is a storage selection transistor. So, the first control signal is a reset control signal, the second control signal is a second reset control signal and the third control signal is a signal for controlling the first transistor.

A second electrode of each capacitor is connected to a node of application of an output control signal, the second conduction terminal of the output transistor being connected to the output node.

Alternatively, a second electrode of each capacitor is connected to a node of application of a reference potential, the pixel further comprising a row selection transistor connected between the second conduction terminal of the output transistor and the output node.

The pixel further comprises a second output transistor having a first conduction terminal connected to a node of application of the power supply potential, having a second conduction terminal coupled to a second output node of the pixel, and having a control terminal connected to the inner node.

The second conduction terminal of the second output transistor is connected to the second output node, or the pixel further comprises a second row selection transistor connected between the second conduction terminal of the second output transistor and the second output node.

The pixel further comprises a transfer transistor connected between the photosensitive area and the sense node.

In an embodiment, an image sensor comprises an array of pixels such as defined hereabove.

In an embodiment, a method for controlling a pixel such as defined hereabove, wherein a storage representative of a potential level of the sense node, comprises: turning on the second transistor by switching the first control signal and setting the second control signal to a value capable of turning off the first readout transistor.

In an embodiment, a pixel comprises: a photosensitive area; a sense node; a first transistor having a control terminal connected to the sense node and having a first conduction terminal connected to an inner node; a second transistor having a first conduction terminal connected to the inner node; a coupling capacitor and a first storage capacitor series-connected between the control terminal of the readout transistor and a node of application of a reference potential.

A second conduction terminal of the second transistor is capable of being selectively coupled to a node of application of the reference potential or to a node for supplying an output signal of the pixel.

A capacitance value of the coupling capacitor is at least ten times smaller than that of the first storage capacitor.

A second conduction terminal of the first transistor is connected to a node of application of a power supply potential.

The pixel further comprises a third transistor having a first conduction terminal connected to the junction node of the first storage capacitor and of the coupling capacitor, and having a second conduction terminal coupled to the inner node.

The pixel further comprises a second storage capacitor connected between the second conduction terminal of the third transistor and a node of application of the reference potential. The pixel further comprises a fourth transistor connected between the second conduction terminal of the third transistor and the inner node.

A control terminal of the second transistor is connected to a node of application of a first control signal; and a control terminal of the third transistor is connected to a node of application of a second control signal.

A control terminal of the fourth transistor is connected to a node of application of a third control signal.

A fifth transistor is connected between the photosensitive area and the sense node, a control terminal of the fifth transistor being connected to a node of application of a fourth control signal.

The first transistor is a readout transistor, the second transistor is an output and biasing transistor, the third transistor is a first selection transistor, the fourth transistor is a second selection transistor and the fifth transistor is a transfer transistor.

In an embodiment, an image sensor comprises an array of pixels such as defined hereabove.

According to the fourth aspect, another embodiment provides a method of controlling a pixel such as defined according to the fourth aspect or of a pixel of an image sensor such as defined according to the fourth aspect, the method comprising: storing a voltage across the first storage capacitor, said voltage being representative of a potential level of the sense node; and reading out the potential level imposed to the first inner node by the coupling capacitor and the first transistor.

To store said voltage, the third transistor is switched from the on state to the off state.

To impose the potential level of the inner node by means of the coupling capacitor and of the first transistor, the fourth transistor is maintained off.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION

Figure 1:
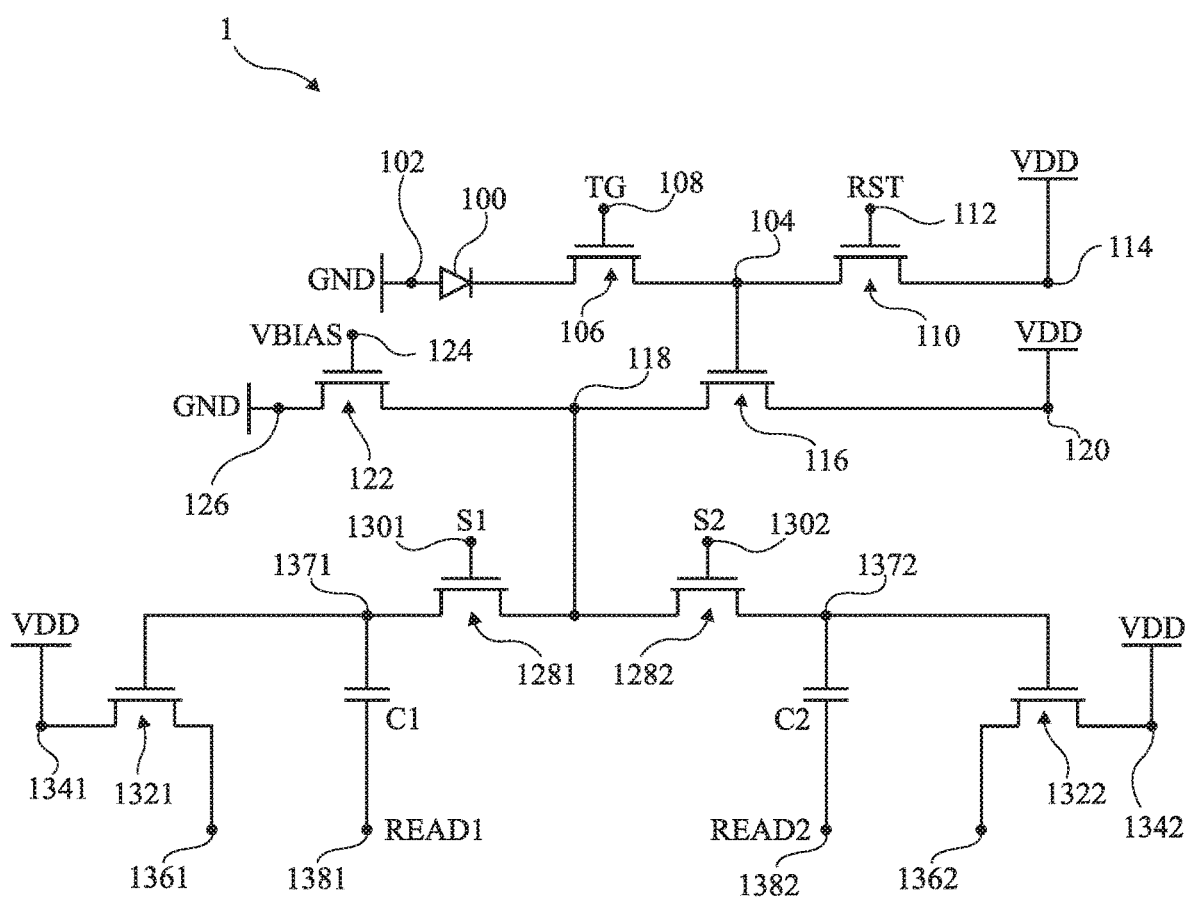
FIG. 1 shows an embodiment of a pixel circuit according to a first aspect of the present disclosure.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the details of the calculations enabling to determine the quantity of light received by a photosensitive or photo-conversion area of a pixel from two signals representative, at two different times, of the potential of a sense node of the pixel (double sampling) have not been described, it being within the abilities of those skilled in the art to implement such calculations.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more intermediate elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

In the following description, when reference is made to a bias, power supply, or reference potential applied to a node, unless otherwise indicated, this means that the potential has a value provided to be constant during the pixel operation, although, in practice, this value may be only approximately constant. Further, when reference is made to a control signal, for example, applied to a node, unless otherwise indicated, this means an analog signal having a continuously-varying value or a digital signal alternating between first and second constant values, where the first and second values may in practice be approximately constant only and may be different for two different digital signals. When reference is made to a control signal with no further precision, this means a digital control signal. Further, for simplification, on-state voltage drops in the transistors switching in all or nothing are neglected in the discussion of the operation.

In the following description, unless otherwise indicated, a potential is referenced to a reference potential, preferably ground GND.

In the following description, unless otherwise indicated, the source and the drain of the transistor are called conduction terminals of a MOS transistor and the transistor gate is called control terminal.

In the following description, unless otherwise indicated, when a MOS transistor is connected between two nodes, terminals, and/or elements, this means that the two nodes, terminals, and/or elements are connected to the respective conduction terminals (source and drain) of the transistor.

The terms "approximately", "substantially", and "in the order of" are used herein to designate a tolerance of plus or minus 10%, preferably of plus or minus 5%, of the value in question.

FIG. 1 shows a first embodiment of a circuit of a pixel 1 according to a first aspect of the present disclosure.

Pixel 1 comprises a photosensitive area 100, that is, an area of conversion of photons into electric charges. Photosensitive area 100 is, for example, a photodiode having a first electrode, for example, its anode, coupled, preferably connected, to a node 102 of application of a reference potential, preferably ground GND. A transfer MOS transistor 106, for example, an N-channel transistor, connects the other electrode of photodiode 100, in this example, its cathode, to a node 104. In this example, the source of transistor 106 is connected to the cathode of photodiode 100. The gate of transistor 106 is connected to a node 108 of application of a control potential or digital signal TG. Node 104 is the pixel sense node and is intended to receive photogenerated charges transferred from photodiode 100.

Pixel 1 also comprises a MOS transistor 110 for resetting node 104, for example, an N-channel transistor. The gate of transistor 110 is connected to a node 112 of application of a reset control potential or digital signal RST. Transistor 110 is connected between sense node 104 and a node 114, the source of transistor 110 being, in this example, connected to node 104. In this embodiment, node 114 is a node of application of a bias potential, here a power supply potential VDD, for example, positive.

Pixel 1 further comprises a MOS transistor 116 for reading from node 104, for example, an N-channel MOS transistor 116. Transistor 116 has its gate connected to node 104. Transistor 116 is connected between an inner (intermediate) node 118 of the pixel and a node 120, the source of the transistor being, in this example, connected to node 118. In this embodiment, node 120 is a node of application of power supply potential VDD.

Pixel 1 further comprises a MOS transistor 122 for biasing transistor 116, for example, an N-channel transistor. The gate of transistor 122 is connected to a node 124. In this embodiment, node 124 is a node of application of a bias potential VBIAS having its value, for example, 0.6 V, selected so that a bias current flows through transistor 116. Transistor 122 is connected between node 118 and a node 126, the source of transistor 122 being, in this example, connected to node 126. In this embodiment, node 126 is a node of application of reference potential GND.

In the embodiment of FIG. 1, pixel 1 comprises two storage selection MOS transistors 1281 and 1282, for example, N-channel transistors. The gates of transistors 1281 and 1282 are connected to respective nodes 1301 and 1302 of application of storage selection control potentials or digital signals, respectively S1 and S2. Transistors 1281 and 1282 are connected between inner node 118 and gates, respectively 1371 and 1372, of output MOS transistors, respectively 1321 and 1322, of the pixel. In other words, transistors 1281 and 1282 are series-connected between nodes 1371 and 1372, their junction node being connected to node 118. In this example, the drains of transistors 1281 and 1282 are connected to node 118. Each output transistor 1321 and 1322, for example, an N-channel transistor, is (directly) connected between a node 1341, respectively 1342, of application of power supply voltage VDD, and an output node 1361, respectively 1362, of the pixel. In this example, the sources of transistors 1321 and 1322 are (directly) connected to respective output nodes 1361 and 1362. A capacitor C1 is (directly) connected between gate 1371 of transistor 1321 and a node 1381 of application of a row selection control potential or digital signal, or output control signal, READ1. A capacitor C2 is (directly) connected between gate 1372 of transistor 1322 and a node 1382 of application of a row selection control potential or digital signal, or output control signal, READ2. Nodes 1381 and 1382 may be connected, with control signals READ1 and READ2 then corresponding to a same signal. In this embodiment, signals READ1 and READ2 are signals having one of their states which is negative, signals READ1 and READ2 switching between ground GND and a negative potential.

Transistors 1301 and 1321 and capacitor C1 define a first output circuit of the pixel, connected between nodes 118 and 1361 of the pixel. Transistors 1302 and 1322 and capacitor C2 define a second output circuit of the pixel, connected between nodes 118 and 1362 of the pixel.

As a specific embodiment, each capacitor C1 and C2 is formed by means of a conductive wall covered with an insulator, or insulated conductive wall, filing a ring-shaped trench surrounding a doped portion of a semiconductor substrate. An electrode of the capacitor then corresponds to the conductor of the wall, the other electrode corresponding to the doped semiconductor portion surrounded by the trench. A trench filled with an insulated conductive wall is currently known to those skilled in the art as a capacitive deep trench isolation or CDTI trench.

Figure 2:
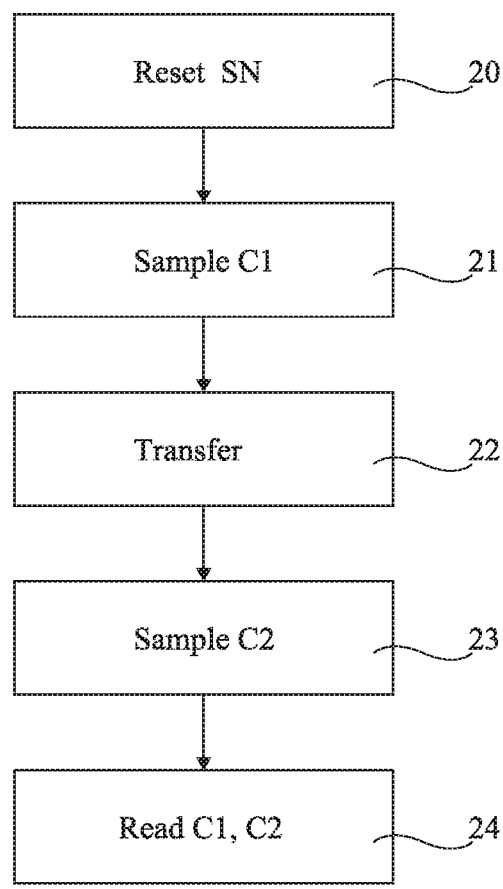
FIG. 2 is a flowchart illustrating an embodiment of a method of controlling the pixel of FIG. 1.

FIG. 2 is a flowchart illustrating an embodiment of a method of controlling the pixel of FIG. 1.

At a step 20 (Reset SN), sense node 104 is reset. To achieve this, control signal RST is set to its high value, for example, potential VDD, to turn on transistor 110. Transistor 110 is then set to the off state, by switching signal RST to its low value, for example, ground GND. The potential of node 104 is then substantially equal to potential VDD of node 114.

Step 20 is implemented while an integration phase, during which charges are photogenerated and stored in photodiode 100, is going on. Preferably, step 20 is implemented towards the end of the integration period. In this example, the photogenerated charges which are stored in photodiode 100 are electrons.

Further, during step 20, control signal TG is maintained at its low value, for example, ground GND, such that transistor 106 is off. Control signals READ1 and READ2 are preferably maintained at their high value, here, ground GND. Further, control signals S1 and S2 are preferably maintained at their high value, for example, voltage VDD, such that the corresponding storage selection transistors (1281 and 1282 in this embodiment) are on. Due to the fact that transistor 116 is configured as a source follower and is biased by transistor 122, the potential of node 118, and thus the voltage across capacitors C1 and C2, depends on the potential of node 104.

At a step 21 (Sample C1) following step 20, information representative of the potential of node 104 is stored in capacitor C1. For this purpose, signal S1 is switched to its low value, for example, ground GND, causing the turning off of the corresponding storage selection transistor (1281 in this embodiment).

At a step 22 (Transfer) following step 21, the photogenerated charges stored in photodiode 100 during the integration phase are transferred to node 104. For this purpose, control signal TG is switched to its high value, for example potential VDD, causing the switching of transistor 106 to the on state. The charge transfer causes a modification of the potential of node 104, the potential of node 104 then being representative of the quantity of transferred charges, and thus of the quantity of light received by photodiode 100 during the integration period which is about to end. The potential variation of node 104 causes a corresponding variation of the potential of node 118, and thus of the voltage across capacitor C2. At the end of step 22, transistor 106 turns off. Such a switching of transistor 106 from the on state to the off state marks the end of the integration period and, for example, the beginning of the next integration period.

At a step 23 (Sample C2) following step 22, information representative of the potential of node 104 is stored in capacitor C2. To achieve this, signal S2 is switched to its low value, for example, ground GND, causing the turning off of the corresponding storage selection transistor (1282 in this embodiment).

At the end of step 23, controls signals READ1 and READ2 are switched to their low (negative values), which causes a corresponding offset of the voltage of nodes 1371 and 1372. The negative low values of potentials READ1 and READ2 are selected so that output transistors 1321 and 1322 of the pixel are off. As an example, particularly when capacitors C1 and C2 are formed from trenches CDTI, the low values of potentials READ1 and READ2 are equal to approximately −1.2 V.

At a step 24 (READ C1, C2) following step 23, the voltages across capacitors C1 and C2 are read out, these voltages being representative of the potentials of node 104, respectively after reset step 20 and after step 22 of transfer of the photogenerated charges. Step 24 corresponds to a step of reading from a pixel.

To achieve this, signals READ1 and READ2 are switched from their low values to their high values, which causes a corresponding offset of the potential of nodes 1371 and 1372. The high values of potentials READ1 and READ2, here, ground GND, are selected so that output transistors 1321 and 1322 turn on and remain so during the entire reading from the pixel. Due to the fact that transistors 1321 and 1322 are configured as a source follower and are biased by a readout circuit (not shown) connected to nodes 1361 and 1362, the potential of nodes 1361 and 1362 depends on the voltage of the respective nodes 1371 and 1372. The potentials of nodes 1361 and 1362, corresponding to output signals of the pixel, are read out by the readout circuit. The quantity of light received by photodiode 100 during the previous integration phase can then be deduced from these output signals, particularly from the difference between these signals.

Steps 20 to 24 are repeated for each integration phase.

Pixel 1 may be used to form an image sensor comprising an array of pixels 1 organized in rows and in columns, a control circuit or row decoder, and a readout circuit or column decoder. The row decoder is preferably common to all the pixels in the array. The row decoder supplies bias potential VBIAS and control signals TG, RST, READ1, READ2, S1, and S2, simultaneously to all the pixels of a same row. Further, in each pixel column, output nodes 1361 and 1362 are common to all the pixels in the column, each node being coupled, preferably connected, to an input of the readout circuit.

In such a sensor, steps 20, 21, 22, and 23 are preferably implemented simultaneously for all the pixels in the array. As a result, each integration phase starts and ends simultaneously for all the sensor pixels, which corresponds to an operation of global shutter type. However, the pixel rows are successively read from or selected while an integration phase is going on, by implementing step 24, row after row, simultaneously for all the pixels in the selected row. The provision of signals READ1 and READ2 having their high and low values selected so that the output transistors of the pixel are respective on and off enables to ensure that, for a given column, an output signal read out by the readout circuit only depends on the pixel having had its row selected.

To successively read from the rows of pixels 1 of the sensor, it could have been devised to add a row selection transistor controlled by a signal READ1, between transistor 1321 and node 1361, and a row selection transistor controlled by a signal READ2, between transistor 1322 and node 1362, and to apply a bias potential rather than a control signal to nodes 1381 and 1382. However, this would have resulted in an increase in the number of transistors of pixel 1.

Figure 3:
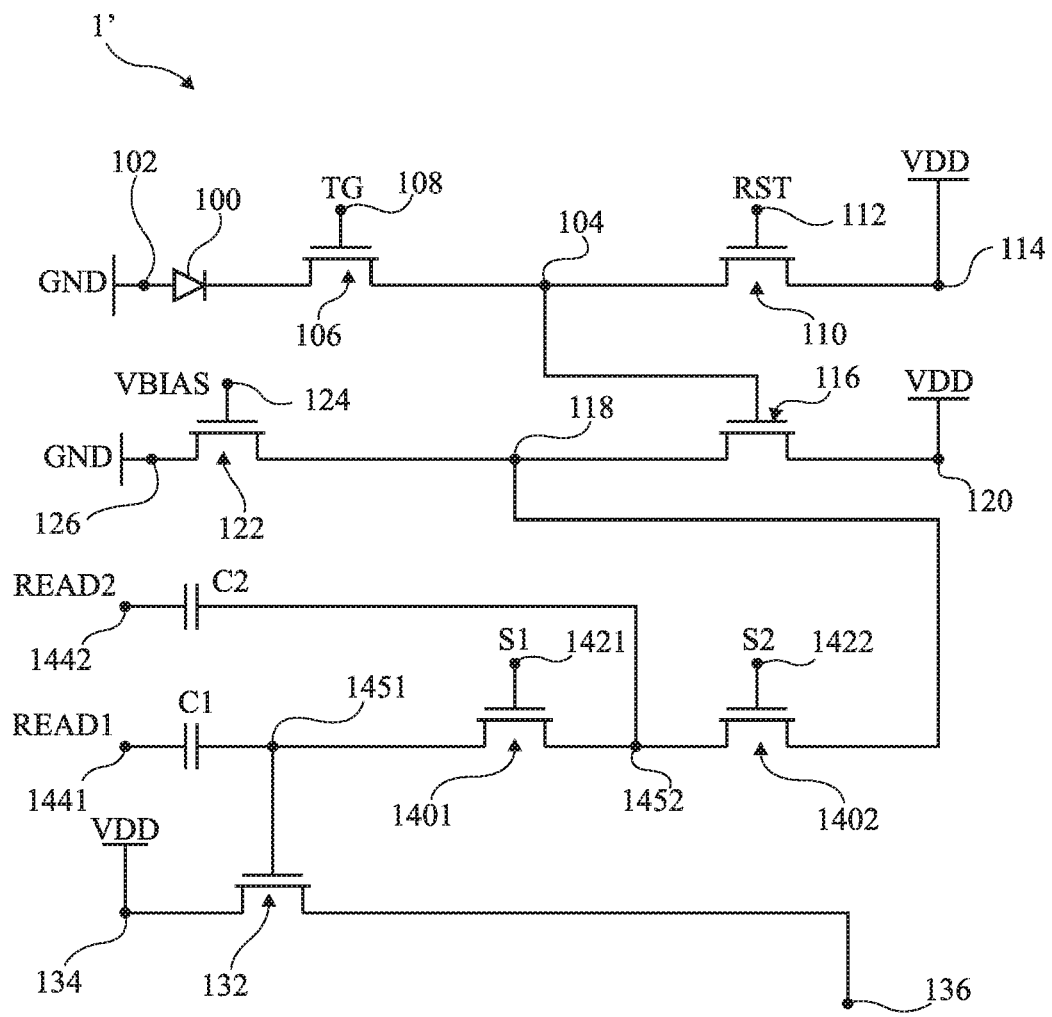
FIG. 3 shows an alternative embodiment of the pixel circuit of FIG. 1.

FIG. 3 shows an alternative embodiment of the pixel circuit of FIG. 1.

Pixel 1' of FIG. 3 differs from that of FIG. 1 in that it comprises a single output node 136 and a single output circuit, connected between inner node 118 and node 136. In the shown example, the single output circuit comprises the two capacitors C1 and C2.

More particularly, in FIG. 3, the output circuit of pixel 1' comprises two storage selection MOS transistors 1401 and 1402, for example, with an N channel, series-connected between the gate of an output MOS transistor 132, for example, with an N channel, and node 118. In this example, transistor 1402 is connected to node 118, transistor 1401 being connected to the gate of transistor 132. The gates of transistors 1401 and 1402 are connected to respective nodes 1421 and 1422 of application of the voltages of digital control signals, respectively S1 and S2. Capacitor C1 is (directly) connected between a node 1441 of application of signal READ1 and the gate of transistor 132, corresponding in this example to the source of transistor 1401. Capacitor C2 is (directly) connected between a node 1442 of application of signal READ2 and junction node 1452 of transistors 1401 and 1402, here corresponding to the source of transistor 1401 and to the drain of transistor 1402. Output transistor 132 is (directly) connected between output node 136 and a node 134 of application of a power supply potential VDD, the source of transistor 132 being, in this example, connected to node 136.

As with the pixel of FIG. 1, nodes 1441 and 1442 may be connected and thus control signals READ1 and READ2 then correspond to a same signal.

The operation previously described in relation with pixel 1 of FIG. 1 can be transposed to pixel 1' of FIG. 3 by adapting readout step 24. More particularly, after having switched signals READ1 and READ2 to their high values to cause a corresponding offset of the potential of nodes 1451 and 1452, and thus the switching to the on state of output transistor 132, a first potential of node 136, corresponding to a first output signal of the pixel, is read out and stored by the readout circuit connected to node 136. The first potential depends on the potential of node 1451, and thus on the voltage across capacitor C1, which is representative of the potential of node 104 after reset step 20. Transistor 1401 is then set to the on state, which causes a modification of the potential of node 1451, and thus of node 136. A second potential of node 136, corresponding to a second output signal of the pixel, is read out by the readout circuit. The second potential is representative of the voltage across capacitors C1 and C2, and thus of the voltage across capacitor C2 at the end of step 23. The quantity of light received by photodiode 100 during the previous integration phase can then be deduced from the first and second output signals.

Similarly to pixel 1 described in relation with FIG. 1, pixel 1' described in relation with FIG. 3 enables to avoid the provision of a row selection transistor, between transistor 132 and node 136.

Pixel 1' of FIG. 3 may be used to form an image sensor similar to that described for pixel 1, with the difference that, in each pixel column, output node 136 is common to all the column pixels and is coupled, preferably connected, to an input of the readout circuit. The operation of such a sensor is similar to that of the image sensor previously described in relation with pixel 1 of FIG. 1.

Figure 4:
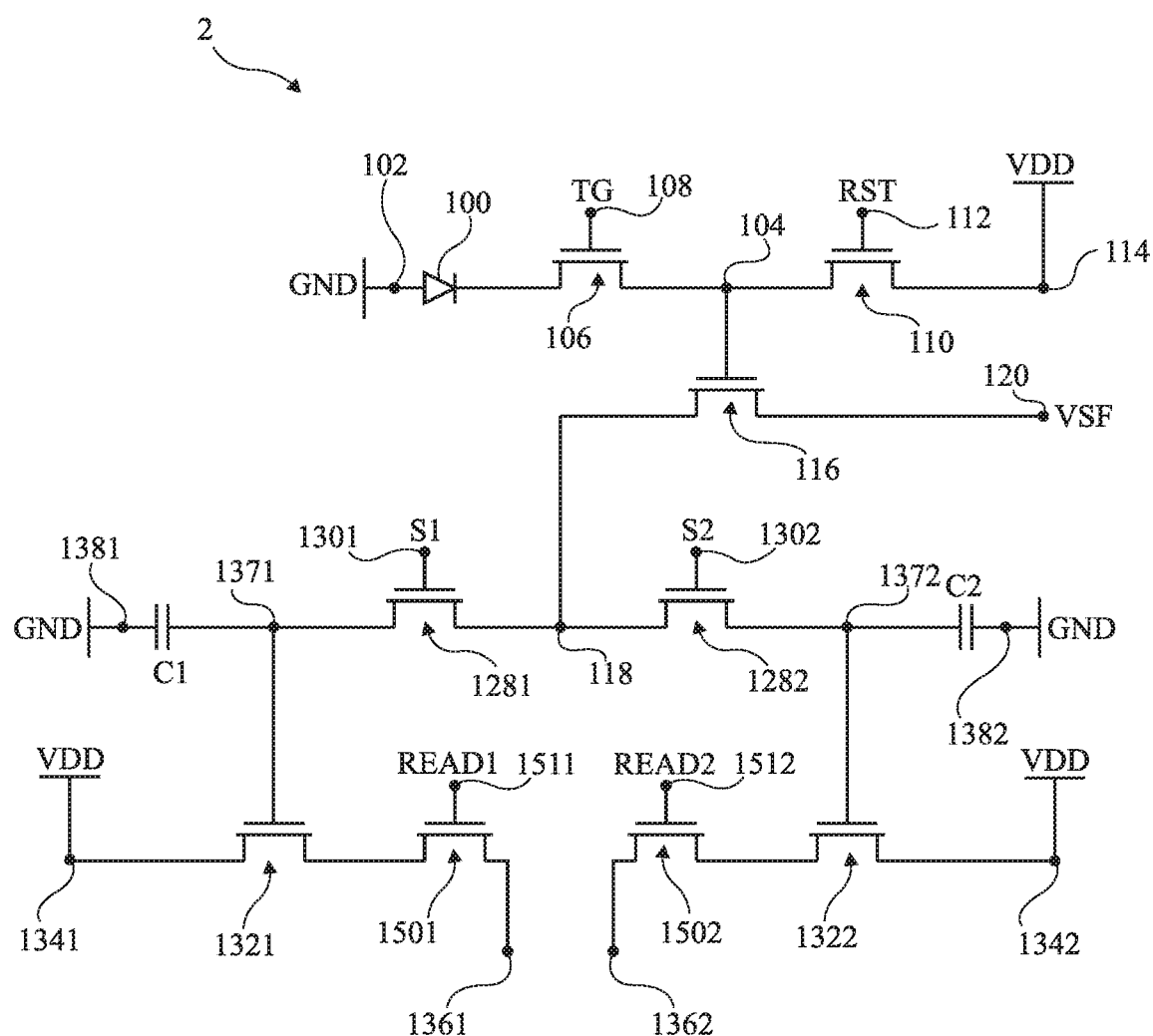
FIG. 4 shows an embodiment of a pixel circuit according to a second aspect of the present disclosure.

FIG. 4 shows an embodiment of a circuit of a pixel 2 according to a second aspect of the present disclosure.

As compared with pixel 1 of FIG. 1, in pixel 2, transistor 122 has been eliminated and node 120 is no longer a node of application of a power supply potential but rather a node of application of an analog signal or potential VSF for controlling transistor 116. Here, node 120 is (directly) connected to a conduction terminal of transistor 116, its drain. Thus, in the shown example, inner (intermediate) node 118 is only connected to readout transistor 116 and to storage selection transistors 1281 and 1282.

Further, in the specific example of FIG. 4, nodes 1381 and 1382 are nodes of application of a bias potential, for example, ground GND. Further, the output circuits of the pixel connected between node 118 and respective nodes 1361 and 1362 comprise row selection MOS transistors, respectively 1501 and 1502. Transistor 1501 is connected between transistor 1321 and output node 1361. Transistor 1502 is connected between transistor 1322 and output node 1362. The gates of transistors 1501 and 1502 are connected to nodes, respectively 1511 and 1512, of application of the respective digital control signals READ1 and READ2. In this embodiment, the high and low values of signals READ1 and READ2 differ from those of FIGS. 1 to 3 and are, for example, respectively potential VDD and ground GND. Nodes 1511 and 1512 may be connected, with signals READ1 and READ2 then corresponding to a same signal. In this example, transistors 1501 and 1502 are N-channel transistors, their drains being connected to the sources of respective transistors 1321 and 1322.

Figure 5:
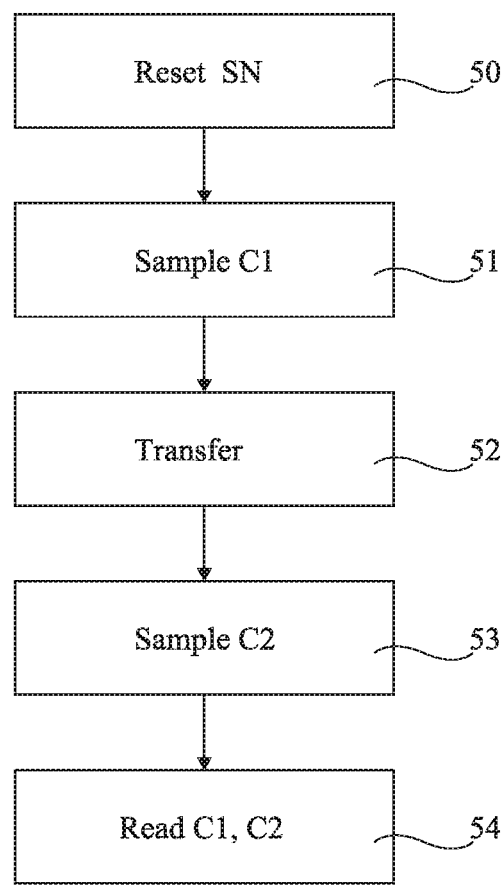
FIG. 5 is a flowchart illustrating an embodiment of a method of controlling the pixel of FIG. 4.

FIG. 5 is a flowchart illustrating an embodiment of a method of controlling pixel 2 of FIG. 4.

At a step 50 (Reset SN), sense node 104 is reset in the same way as at step 20 of FIG. 2. Step 50 is implemented during an integration phase, preferably towards the end thereof.

During step 50, transistor 106 is maintained off and transistors 1281 and 1282 are preferably maintained off. Control signals READ1 and READ2 are preferably maintained at their low value so that transistors 1501 and 1502 are off. Preferably, analog control signal VSF is maintained at its low value, for example, ground GND.

At a step 51 (Sample C1) following step 50, information representative of the potential of node 104 is stored in capacitor C1. This step comprises two successive phases.

In a first phase, the value of signal VSF is progressively increased from its low value, for example, ground GND, to its high value, for example, potential VDD. As long as the potential difference between nodes 104 and 118 is greater than the threshold voltage of transistor 116, the potential of node 118 follows the potential of node 120. This results in a decrease in the gate-source voltage of transistor 116. When the gate-source voltage comes close to the threshold voltage of transistor 116, the latter tends to turn off, the potential of node 118 then tending to settle at a value approximately equal to that of the potential of node 114 minus the threshold voltage of transistor 116. The first phase ends when signal VSF reaches its high value and a second phase starts.

The second phase is a delay phase of fixed duration, for example, 10 µs, during which signal VSF is maintained at its high value. Since transistor 116 is not totally off, the potential of node 118 slowly increases towards a value equal to the potential of node 104 minus the threshold voltage of transistor 116. At the end of the second phase, signal S1 is switched to its low value, for example, the ground, to turn off the corresponding storage selection transistor (1281 in this embodiment). This enables to store the voltage across capacitor C1, and thus the potential of node 118, which is representative of the potential of node 104. Signal VSF is then set back to its low value.

At a step 52 (Transfer) following step 51, the charges photogenerated and stored in photodiode 100 during the integration phase are transferred to node 104 in the same way as at step 22 described in relation with FIG. 2. In particular, the switching of transistor 106 from the on state to the off state implemented during step 52 marks the end of the current integration period and, for example, the beginning of the next integration period.

At a step 53 (Sample C2) following step 52, information representative of the potential of node 104 is stored in capacitor C2.

Step 53 differs from step 51 in that, at the end of the second phase, signal S2 is switched to its low value, rather than signal S1, to turn off the corresponding storage selection transistor (1282 in this embodiment). This enables to store the voltage across capacitor C2, and thus the potential of node 118, which is representative of the potential of node 104. The duration of the second phase of step 53 is identical to that of step 51.

At a step 54 (READ C1, C2) of reading from the pixel, following step 53, output signals representative of the voltages stored across capacitors C1 and C2 are read out. To achieve this, signals READ1 and READ2 are switched to their high values to turn on transistors 1501 and 1502. Due to the fact that transistors 1321 and 1322 are configured as source-followers and are biased by a readout circuit (not shown) connected to nodes 1361 and 1362, the potential of nodes 1361 and 1362 depends on the potential of respective nodes 1371 and 1372. The output signals of the pixel are read out by the readout circuit from nodes 1361 and 1362. The quantity of light received by photodiode 100 during the previous integration phase can then be deduced from these output signals, particularly from the difference between these signals.

Steps 50 to 54 are repeated for each integration phase.

In pixel 2, the elimination of the transistor for biasing readout transistor 116 is made possible by the fact that node 120 of pixel 2 is a node of application of a control signal rather than of a bias potential. This enables to decrease the number of transistors of pixel 2 with respect to a similar pixel which would comprise such a bias transistor.

Figure 6:
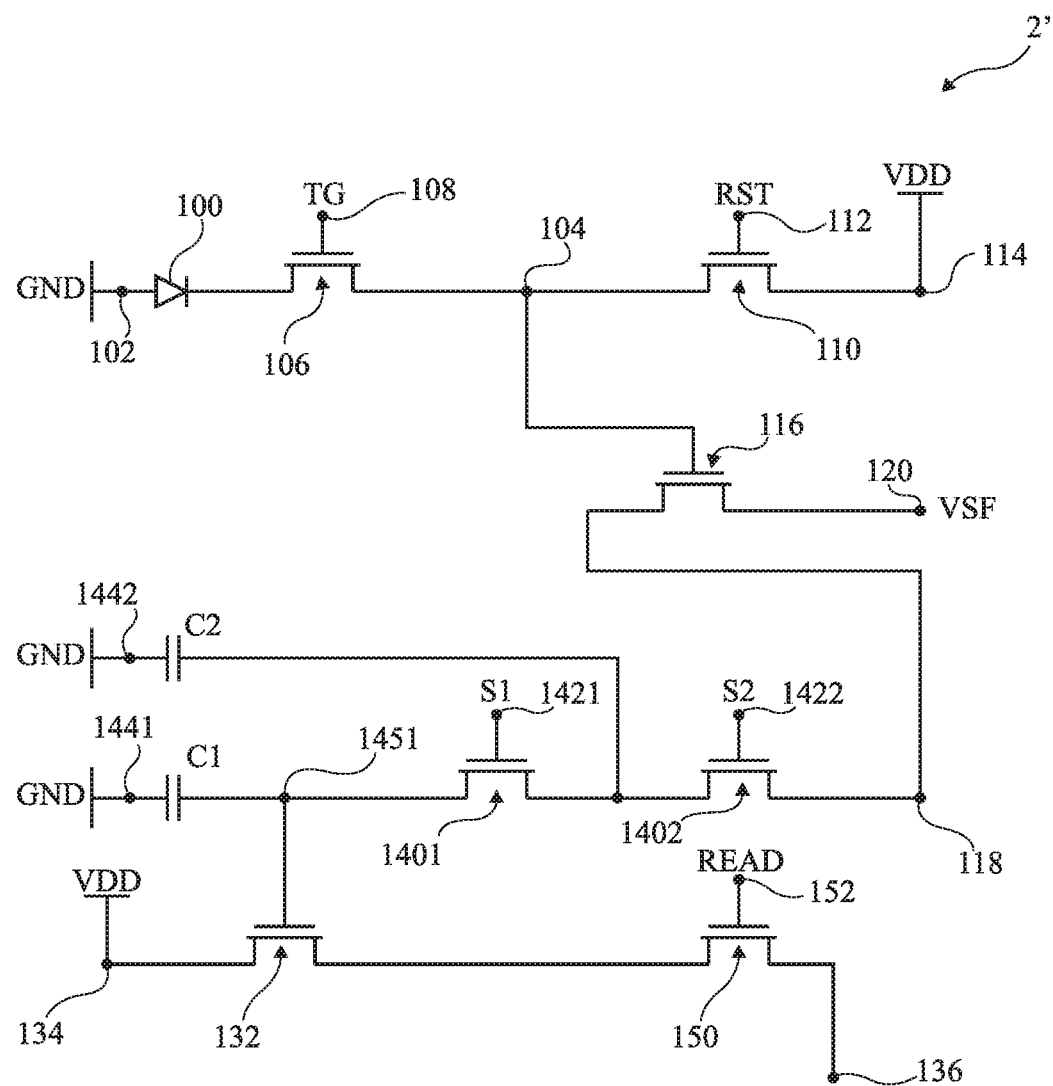
FIG. 6 shows an alternative embodiment of the pixel circuit of FIG. 4.

FIG. 6 shows an alternative embodiment of the pixel circuit of FIG. 4.

Pixel 2' of FIG. 6 differs from pixel 2 of FIG. 4 in that is comprises a single output node 136 of the pixel and a single output circuit connected between inner node 118 and node 136. This single output circuit is similar to that of pixel 1' of FIG. 3.

More particularly, the output circuit of pixel 2' differs from that of pixel 1' in that a row selection MOS transistor 150 is connected between transistor 132 and output node 136 and in that nodes 1441 and 1442 are nodes of application of a bias signal or potential, for example, ground GND, rather than of a control signal. The gate of transistor 150 is connected to a node 152 of application of a row selection control digital signal or potential, or output control signal, READ. In this example, transistor 150 has an N channel, its drain being connected to the source of transistor 132.

The operation of pixel 2, described in relation with FIG. 5, applies to pixel 2' with the difference that the switching of signals READ1 and READ2 to turn on or off transistors 1501 and 1502 are replaced with switching of signal READ to respectively turn on or off transistor 150. Further, readout step 54 is adapted and comprises a switching of signal S1 to turn on transistor 1401, first and second output signals being read from node 136, respectively before and after the switching of transistor 1401 from the off state to the on state.

Pixel 2 of FIG. 4 or pixel 2' of FIG. 6 may be used to form an image sensor comprising an array of pixels 2 and 2' organized in rows and in columns, a control circuit or row decoder, and a readout circuit or column decoder. The row decoder is preferably common to all the pixels in the array. The row decoder supplies, simultaneously to all the pixels of a same row, control signals TG, RST, S1, S2, VSF and, according to the case, READ1 and READ2 (pixel 2) or READ (pixel 2'). The connection of the output nodes of pixels 2 or 2' to the readout circuit is identical to what has been previously described in relation with FIGS. 1 to 3. In such a sensor, for an operation of global shutter type, steps 50, 51, 52, and 53 are implemented simultaneously for all the pixels of the array, and step 54 is implemented, row after row, simultaneously for all the pixels of a selected row.

Figure 7:
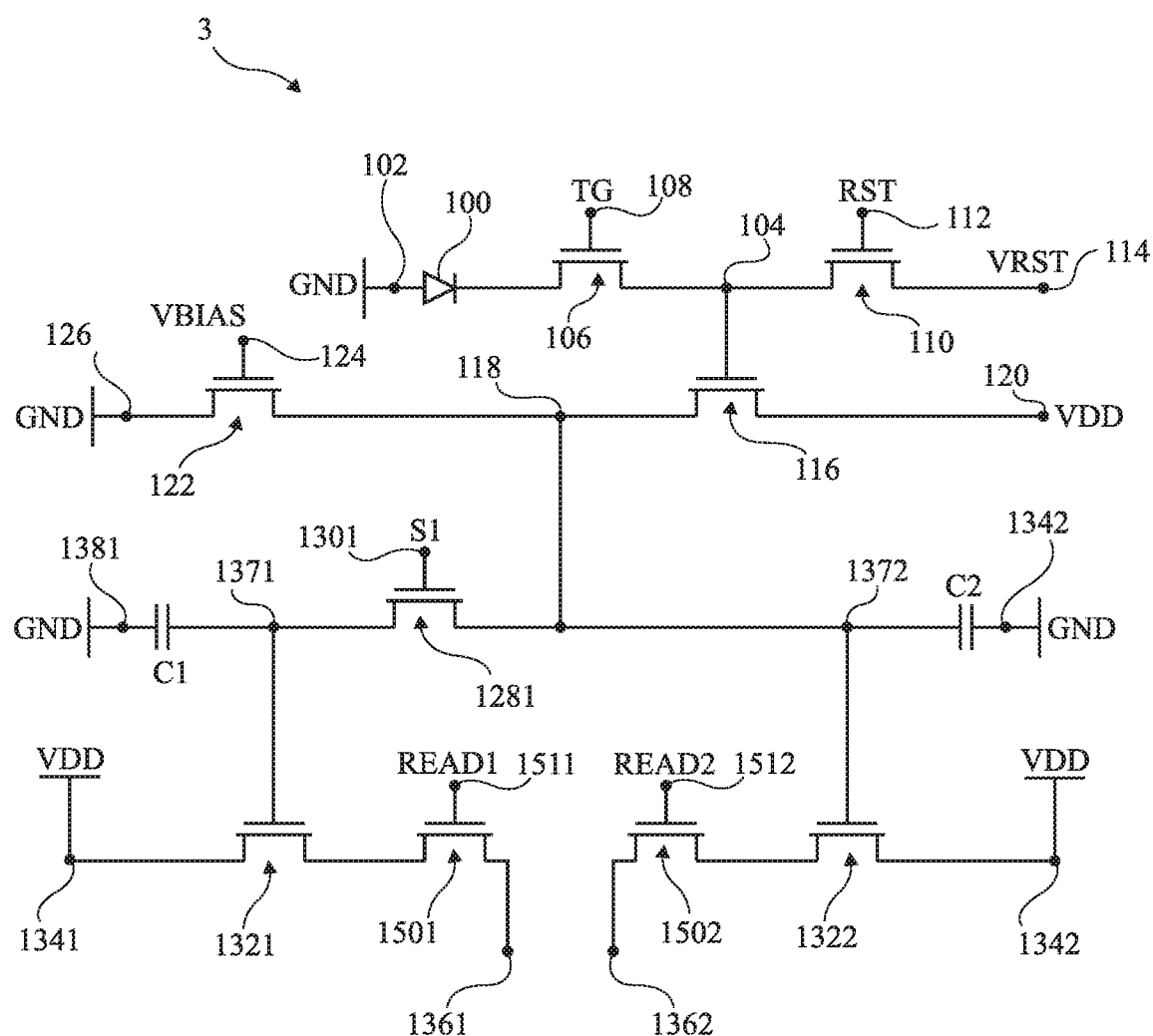
FIG. 7 shows an embodiment of a pixel circuit according to a third aspect of the present disclosure.

FIG. 7 shows an embodiment of a pixel circuit according to a third aspect of the present disclosure.

Pixel 3 of FIG. 7 differs from pixel 1 of FIG. 1 in that:
- nodes 114 and 124 are nodes of application of control potentials or digital signals, respectively VRST and VBIAS, rather than nodes of application of bias potentials, a conduction terminal of transistor 110, here its drain, being (directly) connected to node 114;
- the output circuit, connected between nodes 118 and 1361, is identical to that of pixel 2 of FIG. 4 and is connected between the same nodes 118 and 1361, signal READ1 being for example identical to that described in relation with FIGS. 4 and 5; and
- the output circuit, connected between nodes 118 and 1362, corresponds to that of pixel 2 of FIG. 4 and is connected between these same nodes 118 and 1362, with the difference that, in pixel 3, transistor 1282 has been eliminated, node 118 being thus directly connected to the gate of output transistor 1322. Signal READ2 is for example identical to that described in relation with FIGS. 4 and 5.

Figure 8:
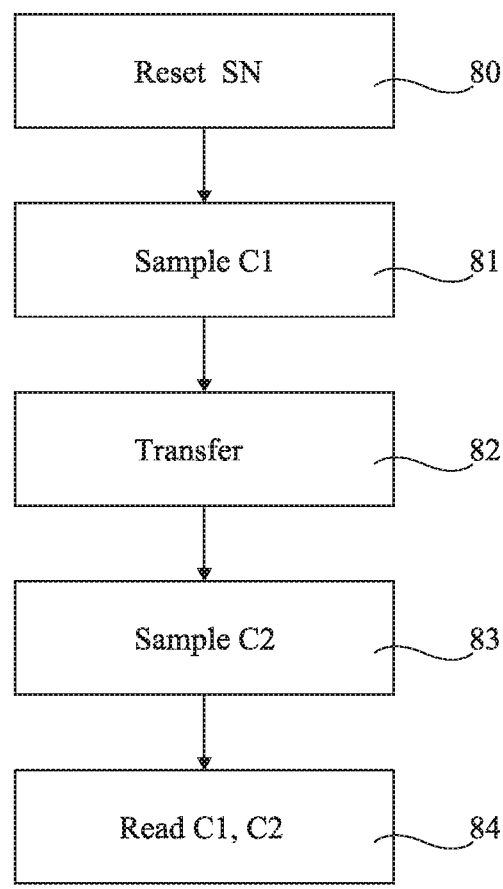
FIG. 8 is a flowchart illustrating an embodiment of a method of controlling the pixel of FIG. 7.

FIG. 8 is a flowchart illustrating an embodiment of a method of controlling pixel 3 of FIG. 7.

At a step 80 (Reset SN), implemented during an integration phase, preferably towards the end thereof, sense node 104 is reset. To achieve this, digital control signal RST is set to its high value, for example, potential VDD, to turn on transistor 110. Further, signal VRST is set to its high value, for example, potential VDD. Transistor 110 is then turned off by the switching of signal RST to its low value, for example, ground GND. The potential of node 104 is then substantially equal to the high value of signal VRST. Signal VRST thus also corresponds to a digital control signal for resetting node 104.

During step 80, transistor 106 is maintained off and transistor 1281 is preferably maintained off. Control signals READ1 and READ2 are preferably maintained at their low value so that transistors 1501 and 1502 are maintained off.

At a step 81 (Sample C1) following step 80, information representative of the potential of node 104 is stored in capacitor C1. To achieve this, signal VBIAS is set to its high value, for example, 0.6 V, such that a bias current flows through transistor 116. Thus, the potential of node 118 depends on the potential of node 104 due to the fact that transistor 116 is configured as a source follower. Signal S1 is then switched to its low value, for example, ground GND, causing the turning off of storage selection transistor 1281 and the storage of the voltage across capacitor C1.

At a step 82 (Transfer) following step 81, the photogenerated charges stored in photodiode 100 are transferred to node 104 by the switching of signal TG to turn on transistor 106. This results in a modification of the potential of node 104. Transistor 106 is then switched to the off state, by the switching of signal TG. Such a switching of transistor 106 from the on state to the off state marks the end of the integration period and, for example, the beginning of the next integration period. During step 82, signal VBIAS is maintained at its high value, so that the potential of node 118, and thus the voltage across capacitor C2, depends on the potential of node 104.

At a step 83 (Sample C2) following step 82, information representative of the potential of node 104 is stored in capacitor C2. To achieve this, transistor 122 is turned off by the switching of signal VBIAS to its low value, for example, ground GND. As a result, transistor 116 is no longer biased. Transistor 116 is then turned off by setting of signal VRST to its low value, for example, ground GND, capable of turning off transistor 116 when it is applied to the gate of transistor 116. Transistor 110 is then turned on, by the switching of signal RST to its high value, to apply signal VRST to the gate of transistor 116. As a result, the potential of node 118, and thus the voltage across capacitor C2, no longer varies. At the end of step 83, the potential of node 118, and thus the voltage across capacitor C2, is substantially the same as at the end of step 82 and is representative of the potential of node 104 at the end of transfer step 82.

At a step 84 (READ C1, C2) following step 83, the voltages across capacitors C1 and C2 are read out. Step 84 is identical to step 54 described in relation with FIG. 5. During step 84, signals VRST, RST, and VBIAS are maintained at the same values as at the end of step 83.

Steps 80 to 84 are repeated for each integration phase.

The provision of a control signal on node 114, configured to switch transistor 116 to the off state, enables to do away with the presence of a storage selection transistor between node 1372 and node 118.

Figure 9:
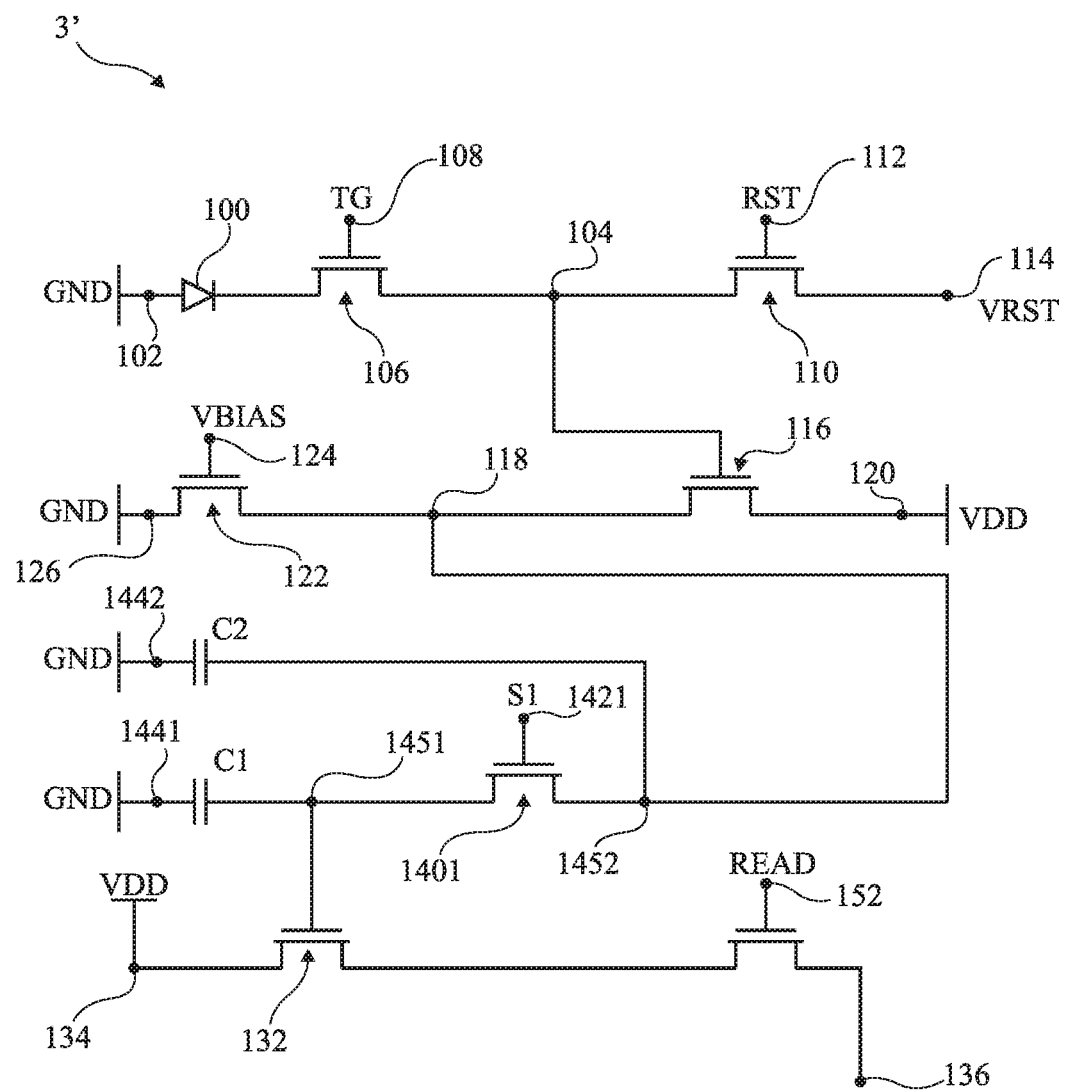
FIG. 9 shows an alternative embodiment of the pixel circuit of FIG. 7.

FIG. 9 shows an alternative embodiment of the pixel circuit of FIG. 7.

Pixel 3' of FIG. 9 differs from pixel 3 of FIG. 7 in that it comprises a single output node 136 of the pixel and a single output circuit connected between inner node 118 and node 136. This output circuit is similar to that of pixel 2' of FIG. 6.

More particularly, the output circuit of pixel 3' corresponds to that of pixel 3' where transistor 1422 has been eliminated. In other words, node 118 is directly connected to transistor 1401, nodes 118 and 1452 being connected.

The operation of pixel 3, described in relation with FIG. 8, applies to pixel 3' of FIG. 9 with the difference that the switching of signals READ1 and READ2 to turn on or off transistors 1501 and 1502 are replaced with switching of signal READ to respectively turn on or off transistor 150. Further, readout step 84 is adapted and comprises a switching of switch S1 to turn on transistor 1401, the first and second output signals of the pixel being read from node 136, respectively before and after the switching of transistor 1401 from the off state to the on state.

Pixel 3 of FIG. 7 or pixel 3' of FIG. 9 may be used to form an image sensor comprising an array of pixels 3 and 3' organized in rows and in columns, a control circuit or row decoder, and a readout circuit or column decoder. The row decoder is preferably common to all the pixels in the array. The row decoder supplies, simultaneously to all the pixels of a same row, control signals VBIAS, TG, RST, VRST, S1 and, according to the case, READ1 and READ2 (pixel 3) or READ (pixel 3'). The connection of the output nodes of pixels 3 or 3' to the readout circuit is identical to what has been previously described in relation with FIGS. 1 to 3. In such a sensor, for an operation of global shutter type, steps 80, 81, 82, and 83 are implemented simultaneously for all the pixels of the array, and step 84 is implemented, row after row, simultaneously for all the pixels of a selected row.

Figure 10:
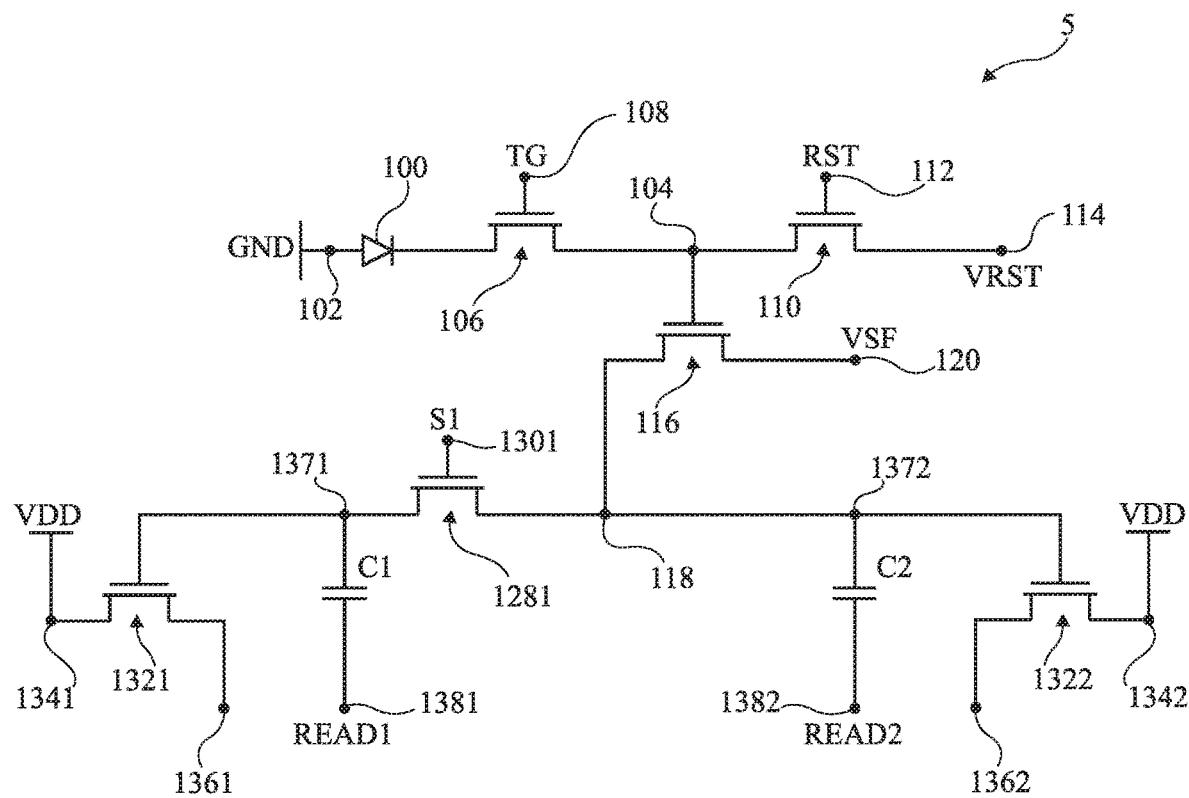
FIG. 10 shows an embodiment of a pixel circuit corresponding to the combination of the embodiments of FIGS. 1, 4 and 7.

FIG. 10 shows another embodiment of a pixel circuit 5. This embodiment corresponds to the combination of the embodiments described in relation with respective FIGS. 1, 4, and 7.

Pixel 5 of FIG. 10 differs from pixel 1 of FIG. 1 in that transistors 122 and 1382 have been eliminated, and in that nodes 114 and 120 are nodes of application of the previously-described control signals, respectively VRST and VSF.

Thus, as compared with pixel 1, in pixel 5, node 118 is only connected to transistor 1281 and to junction node 1372 of capacitor C2 and of the gate of transistor 1322, where nodes 1372 and 118 may be confounded.

An embodiment of a method of controlling pixel 5 comprises the following successive steps:
 a first step where the potential of node 104 is reset, this first step being similar to step 80 (FIG. 8, pixel 3);
 a second step where information representative of the potential of node 104 is stored in capacitor C1, this second step being similar to step 51 (FIG. 5, pixel 2);
 a third step where photogenerated charges stored in photodiode 100 are transferred to node 104, this third step being similar to steps 22 (FIG. 2, pixel 1) and 52 (FIG. 5, pixel 2);
 a fourth step where information representative of the potential of node 104 is stored in capacitor C2. This fourth step implements the two phases of previously-described step 53 (FIG. 5, pixel 2), with the difference that, at the end of the second phase, transistor 116 is set to the off state by the switching of signal VRST to its low value and then by the turning-on of transistor 110, similarly to what has been described for step 83 (FIG. 8, pixel 3). Further, at the end of this fourth step, signals READ1 and READ2 are switched to their low values to turn off transistors 1321 and 1322; and
 a fifth step where the output signals of pixel 5 are read out, this fifth step being similar to step 24 (FIG. 2, pixel 1).

These steps are repeated for each integration period.

Pixel 5 may be used in a sensor of the type of those previously described. In particular, for an operation of global shutter type, the first, second, third, and fourth steps are simultaneously implemented for all the pixels 5 of the sensor, the fifth step being implemented row after row, simultaneously for all the pixels 5 of the selected row.

Figure 11:
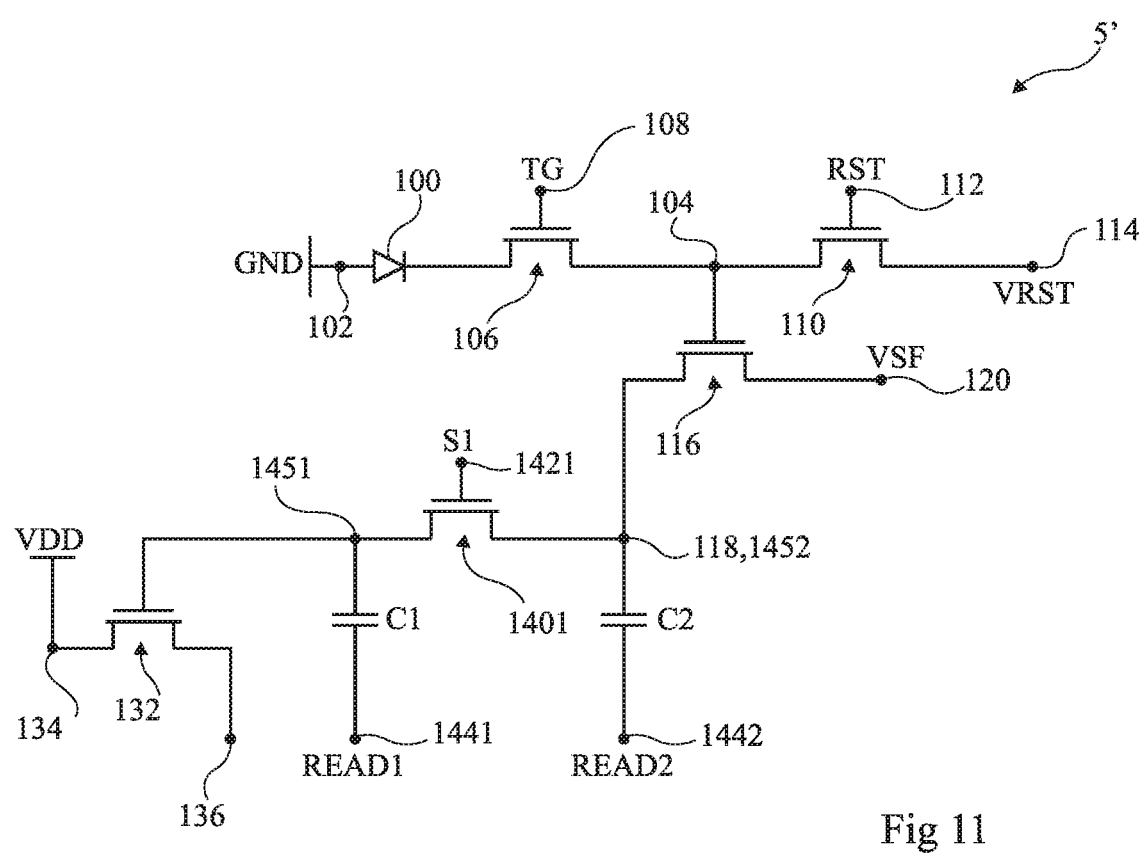
FIG. 11 shows an alternative embodiment of the pixel of FIG. 10.

FIG. 11 shows an alternative embodiment of pixel 5 of FIG. 10. This pixel variation 5' corresponds to the combination of the variations described in relation with respective FIGS. 3, 6, and 9.

Pixel 5' of FIG. 11 differs from pixel 1 of FIG. 3 in that transistors 122 and 1402 have been eliminated, and in that nodes 114 and 120 are nodes of application of the previously-described digital control signals, respectively, VRST and VSF.

Thus, as compared with pixel 1' of FIG. 3, in pixel 5', node 118 is only connected to transistor 1401 and to capacitor C2, nodes 118 and 1452 being confounded.

The control method described in relation with pixel 5 of FIG. 10 transposes to pixel 5' of FIG. 11 by adapting the fifth step of reading from the pixel so that it further comprises a switching of transistor 1401 from the off state to the on state, the first and second output signals of the pixel being read from node 136, respectively before and after the switching of transistor 1401.

Pixel 5' of FIG. 11 may be used in an image sensor, in particular of global shutter type, as described for pixel 5 of FIG. 10.

Although this has not been shown and detailed, the embodiments described in relation with FIGS. 1, 4, and 7 may be combined two by two and, similarly, the alternative embodiments described in relation with FIGS. 3, 6, and 9 may be combined two by two. It is within the abilities of those skilled in the art, in the light of the present disclosure, to implement such combinations and to adapt the previously-described control methods to the pixels corresponding to these combinations.

In particular, in the case of a combination of the embodiments of FIGS. 4 and 7, or of the alternative embodiments of FIGS. 6 and 9, during the step of storage, in capacitor C2, of information representative of the potential of node 104, the turning-off of transistor 116 at the end of the second phase of this step (delay period with signal VSF at its high value) is carried out by switching signal VRST to its low value and by switching transistor 110 to the on state to turn off transistor 116.

Figure 12:
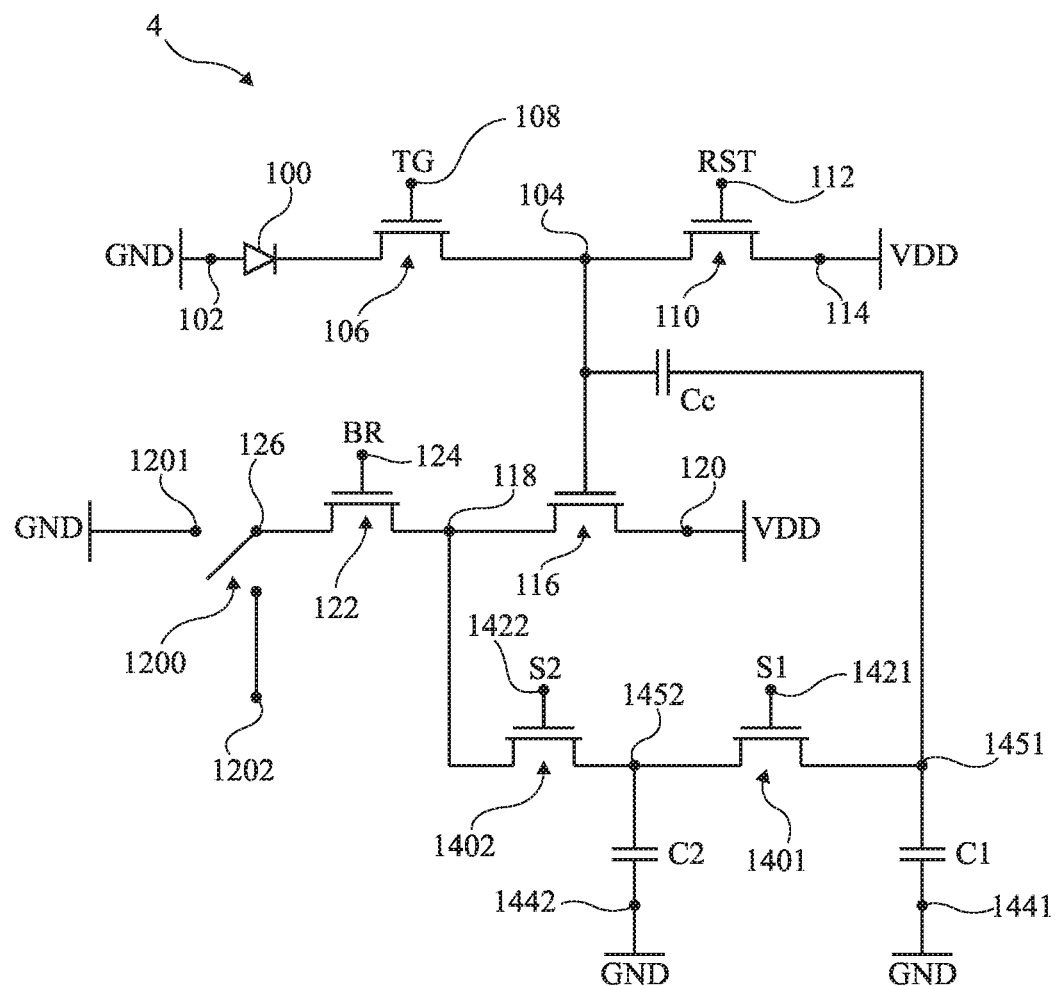
FIG. 12 shows an embodiment of a pixel circuit according to a fourth aspect of the present disclosure.

FIG. 12 shows an embodiment of a circuit of a pixel 4 according to a fourth aspect of the present disclosure.

Pixel 4 differs from pixel 1' of FIG. 3 in that:
 nodes 1441 and 1442 are nodes of application of a bias potential, for example, ground GND;
 transistor 132 has been eliminated;
 node 124 is a node of application of a control signal BR taking three constant values, that is, a low value, for example, ground potential GND, a high value, for example, potential VDD, and an intermediate value between potentials VDD and GND, where these values may in practice be only approximately constant;
 node 126 is selectively an output node of the pixel or a node of application of a reference potential, for example, the ground; and
 a coupling capacitor Cc is (directly) connected between sense node 104 and inner node 1451 having an electrode of capacitor C1 connected thereto, the other electrode of capacitor C1 being connected to node 1441.

Capacitor Cc has a capacitance value smaller than those of capacitors C1 and C2, for example, at least 10 times smaller, preferably at least 20 times smaller. As an example, capacitors C1 and C2 have values of approximately 20 fF, for example, 20 fF, capacitor Cc having a value of approximately 1 fF, for example, 1 fF.

In the example of FIG. 12, a switch 1200 selectively coupling node 126 of pixel 4 to a node 1201 of application of the reference potential or to a node 1202 of supply of an output signal of pixel 4 has been shown.

In the example of FIG. 12, the selection control signal is received by switch 1200.

Such a pixel enables to use transistor 122 as a transistor for biasing transistor 116 when signal BR is at its intermediate value, or as a row selection transistor, or output transistor, when signal BR is at its high or low value. This enables to avoid the provision of a dedicated row selection transistor, and thus to decrease the number of transistors in the pixel. Preferably, when transistor 122 is used as a transistor for biasing transistor 116 or as a row selection transistor of pixel 4, node 126 is respectively coupled to node 1201 or to node 1202, by switch 1200 in the example of FIG. 12.

Figure 13:
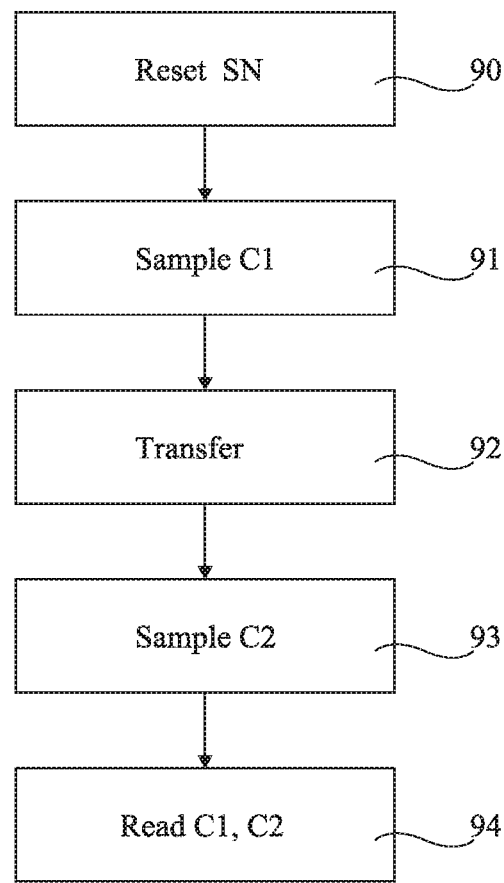
FIG. 13 is a flowchart illustrating an embodiment of a method of controlling the pixel of FIG. 12.

FIG. 13 is a flowchart illustrating an embodiment of a method of controlling the pixel of FIG. 12.

At a step 90 (Reset SN), the potential of node 104 is reset by the switching of signal RST to its high value, for example, potential VDD, to turn on transistor 110. Transistor 110 is then turned off, by the switching of signal RST to its low value, for example, ground GND.

Step 90 is implemented during an integration period, transistor 106 then being off. Preferably, this step is implemented towards the end of the integration period.

During step 90, transistors 1401 and 1402 are preferably on, signals S1 and S2 being maintained at their high value, for example, potential VDD. Further, node 126 is coupled to node 1201 of application of the reference potential and signal BR is at its intermediate value, for example, 0.6 V, so that a bias current flows through transistor 116.

Due to the fact that transistor 116 is configured as a source follower and is biased by transistor 122, the voltage across capacitors C1 and C2 is representative of the potential of node 104.

At a step 91 (Sample C1) following step 90, while transistor 122 biases transistor 116, the voltage across capacitors C1 and C2 is stored in capacitor C1. To achieve this, signal S1 is switched to its low value, for example, ground GND, to turn off transistor 1401.

At a step 92 (Transfer) following step 91, preferably carried out while transistor 122 biases transistor 116, the photogenerated charges stored in photodiode 100 are transferred to node 104 by the switching of signal TG to its high value, for example, potential VDD, to turn on transistor 106. This results in a modification of the potential of node 104, and thus of the voltage across capacitor C2 due to the fact that transistor 116 is configured as a source follower and is biased by transistor 122. It should be noted that such a variation of the potential of node 104 has but a negligible influence on the voltage across capacitor C1 due to the fact that capacitance Cc is small as compared with capacitance C1. Transistor 106 is then turned off, by the switching of signal TG to its low value. Such a switching marks the end of the integration period and, for example, the beginning of the next integration period.

At a step 93 (Sample C2) following step 92, transistor 122 biases transistor 116 and the voltage across capacitor C2, which is representative of the potential of node 104, is stored. To achieve this, transistor 1402 is turned off by the switching of signal S2 to its low value, for example, ground GND. At the end of step 93, signal BR is set to its low value to turn off transistor 122.

At a step 94 (Read C1, C2) following step 93, the pixel is read from, that is, two output signals representative of the voltages stored across respective capacitors C1 and C2 are read from node 126 by a readout circuit coupled to this node, via switch 1200 in the example of FIG. 12. To achieve this, node 126 is coupled to node 1202 and transistor 122 is turned on by the switching of signal BR to its high value.

Due to the fact that transistors 106 and 110 are off and that capacitor Cc couples node 1451 to node 104, the potential of node 104 is imposed by the potential of node 1451, and thus by the voltage across capacitor C1. Further, since transistor 1402 is off and transistor 116 is configured as a source follower, the potential of node 118 depends on the potential of node 104, and thus on the voltage across C1. Thus, a first signal representative of the voltage across C1 is read from node 126.

Transistor 1401 is then turned on, by the switching of signal S1 to its high value. This results in a modification of the potential of node 1451, and thus of node 126, which depends on the voltage which was present across capacitor C2 before the switching of transistor 1401. Thus, a second signal is read from node 126.

The quantity of light received by photodiode 100 during the integration period can then be deduced from these first and second output signals of the pixel.

Preferably, at the end of step 94, transistor 122 is turned off by the switching of signal BR to its low value.

Pixel 4 of FIG. 12 may be used to form an image sensor comprising an array of pixels 4 organized in rows and in columns, a control circuit or row decoder, and a readout circuit or column decoder. The row decoder is preferably common to all the pixels in the array. The row decoder supplies, simultaneously to all the pixel of a same row, control signals TG, RST, S1, S2, and BR. Preferably, in each pixel column, node 126 is common to all the pixels in the column. Preferably, common node 126 is selectively coupled to a node 1202 common to all the pixels in the column or to a node 1201 common to all the pixels in the column, for example, by a switch 1200 common to all the pixels in the column. As an example, switch 1200 may form part of the column decoder, the node 126 common to all the pixels of a column then corresponding to an input node of the column decoder, or may be external to the column decoder, node 1202 then corresponding to an input node of the column decoder. In such a sensor, for an operation of global shutter type, steps 90, 91, 92, and 93 are implemented simultaneously for all the pixels in the array and step 94 is implemented, row after row, simultaneously for all the pixels of a selected row.

Various embodiments and variations have been described. It will readily occur to those skilled in the art that certain features of these various embodiments and variations may be combined, and other variations will occur to those skilled in the art. In particular, it is within the abilities of those skilled in the art to adapt the described embodiments and variations to the case where the photogenerated charges which are stored in photodiode 100 are holes, particularly by replacing N-channel transistors with P-channel transistors and by adapting the control signals of these transistors and the values of the reference, power supply, and/or bias potentials, the power supply potential being for example likely to be negative.

Finally, the practical implementation of the described embodiments and variations is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A pixel, comprising:
   a photosensitive circuit;
   a sense node;
   a first transistor; and
   a first capacitor having a first electrode connected to a control terminal of the first transistor and having a second electrode connected to a node of application of a first control signal;
   wherein said first control signal is controlled to have a negative voltage level following sampling of a signal at said sense node which produces a sampled signal on the first capacitor, and to switch to a non-negative voltage during a read-out by the first transistor of the sampled signal.

2. The pixel of claim 1, wherein the first transistor is connected between a node of application of a power supply potential and an output node of the pixel, the control terminal of the first transistor being coupled to an inner node of the pixel.

3. The pixel of claim 2, further comprising a second transistor having a control terminal connected to the sense node, having a first conduction terminal connected to the inner node, and having a second conduction terminal connected to a first node of application of one of the power supply potential or a second control signal.

4. The pixel of claim 3, wherein the first node is a node of application of the second control signal and there is no transistor connected to the inner node and configured to deliver a bias current to the second transistor.

5. The pixel of claim 3, further comprising a third transistor having a first conduction terminal connected to the sense node and having a control terminal connected to a node of application of a third control signal.

6. The pixel of claim 5, wherein a second conduction terminal of the third transistor is connected to a node of application of the power supply potential.

7. The pixel of claim 5, wherein a second conduction terminal of the third transistor is connected to a node of application of a fourth control signal.

8. The pixel of claim 5, wherein:
the first transistor is an output transistor;
the second transistor is a readout transistor; and
the third transistor is a reset transistor.

9. The pixel of claim 7, wherein:
the first control signal is an output control signal;
the second control signal is a signal for controlling the second transistor;
the third control signal is a reset control signal; and
the fourth control signal is a second reset control signal.

10. The pixel of claim 1, further comprising:
a storage selection transistor connected between the first electrode of the first capacitor and the inner node;
a second output transistor having a first conduction terminal connected to a node of application of the power supply potential, having a second conduction terminal connected to a second output node, and having a control terminal coupled to the inner node; and
a second capacitor having a first electrode connected to the control terminal of the second output transistor and having a second electrode connected to a node of application of a second output control signal.

11. The pixel of claim 10, wherein the first electrode of the second capacitor is connected to the inner node or wherein the pixel comprises a second storage selection transistor connected between the first electrode of the second capacitor and the inner node.

12. The pixel of claim 1, further comprising:
a second capacitor having a first electrode coupled to the inner node and having a second electrode connected to a node of application of a second output control signal; and
a storage selection transistor connected between the first electrode of the first capacitor and a first electrode of the second capacitor.

13. The pixel of claim 1, further comprising a transfer transistor connected between the photosensitive circuit and the sense node.

14. An image sensor comprising an array of pixels of claim 1.

15. The pixel of claim 1, wherein controlling the first control signal to have the negative voltage forces the first transistor into an off state and, wherein controlling the first control signal to have the non-negative voltage permits turn on of the first transistor.

16. The pixel of claim 1, wherein the non-negative voltage is a ground voltage.

17. A pixel, comprising:
a photodiode;
a sense node;
a transfer transistor coupled between a node of the photodiode and the sense node;
a first source-follower transistor having a control terminal coupled to the sense node;
a first selection transistor coupled between an inner node at a source terminal of the first source-follower transistor and a first gate node;
a first capacitor having a first electrode connected to the first gate node and a second electrode coupled to receive a first control signal having a voltage that switches between a negative voltage and a non-negative voltage; and
a second source-follower transistor having a control terminal coupled to the first gate node and a source terminal at a first output node.

18. The pixel of claim 17, wherein the non-negative voltage is a ground voltage.

19. The pixel of claim 17, wherein the negative voltage at the second electrode of the first capacitor causes the second source-follower transistor to be in a turned off state, and wherein the non-negative voltage at the second electrode of the first capacitor causes the second source-follower transistor to be in a turned on state.

20. The pixel of claim 17, further comprising:
a second selection transistor coupled between the inner node at the source terminal of the first source-follower transistor and a second gate node;
a second capacitor having a first electrode connected to the second gate node and a second electrode coupled to receive a second control signal having a voltage that switches between the negative voltage and the non-negative voltage; and
a third source-follower transistor having a control terminal coupled to the second gate node and a source terminal at a second output node.

21. The pixel of claim 20, wherein the non-negative voltage is a ground voltage.

22. The pixel of claim 20, wherein the negative voltage at the second electrodes of the first and second capacitors causes the second and third source-follower transistors, respectively, to be in a turned off state, and wherein the non-negative voltage at the second electrodes of the first and second capacitors causes the second and third source-follower transistors, respectively, to be in a turned on state.

23. A pixel, comprising:
a photodiode;
a sense node;
a transfer transistor coupled between a node of the photodiode and the sense node;
a first source-follower transistor having a control terminal coupled to the sense node;
a first selection transistor coupled between an inner node at a source terminal of the first source-follower transistor and a junction node;
a first capacitor having a first electrode connected to the junction node and a second electrode coupled to receive a first control signal having a voltage that switches between a negative voltage and a non-negative voltage;
a first selection transistor coupled between the junction node and a gate node;
a second capacitor having a first electrode connected to the gate node and a second electrode coupled to receive a second control signal having a voltage that switches between the negative voltage and the non-negative voltage; and
a second source-follower transistor having a control terminal coupled to the gate node and a source terminal at an output node.

24. The pixel of claim 23, wherein the non-negative voltage is a ground voltage.

25. The pixel of claim 23, wherein the negative voltage at the second electrode of the second capacitor causes the second source-follower transistor to be in a turned off state, and wherein the non-negative voltage at the second electrode of the second capacitor causes the second source-follower transistor to be in a turned on state.

\* \* \* \* \*